United States Patent
Yuasa (10) Patent No.: US 9,287,715 B2
(45) Date of Patent: Mar. 15, 2016

(54) POWER DISTRIBUTION DEVICE, POWER DISTRIBUTION SYSTEM AND METHOD FOR SUPPRESSING INRUSH CURRENT

(71) Applicant: FUJITSU LIMITED, Kawasaki (JP)

(72) Inventor: Kentarou Yuasa, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 631 days.

(21) Appl. No.: 13/690,411

(22) Filed: Nov. 30, 2012

(65) Prior Publication Data
US 2013/0200701 A1    Aug. 8, 2013

(30) Foreign Application Priority Data
Feb. 2, 2012    (JP) ................................ 2012-020623

(51) Int. Cl.
| | |
|---|---|
| *H02J 3/00* | (2006.01) |
| *H02J 4/00* | (2006.01) |
| *G06F 1/26* | (2006.01) |
| *H02J 1/08* | (2006.01) |
| *H02J 5/00* | (2006.01) |

(52) U.S. Cl.
CPC ... *H02J 4/00* (2013.01); *G06F 1/26* (2013.01); *H02J 1/08* (2013.01); *H02J 5/00* (2013.01); *Y10T 307/25* (2015.04)

(58) Field of Classification Search
CPC ....................................................... H02J 4/00
See application file for complete search history.

(56) References Cited

U.S. PATENT DOCUMENTS

| | | | |
|---|---|---|---|
| 5,619,127 A | | 4/1997 | Warizaya |
| 5,764,926 A | * | 6/1998 | Fukuda et al. ................ 710/302 |

FOREIGN PATENT DOCUMENTS

| | | |
|---|---|---|
| JP | 5-48479 | 2/1993 |
| JP | 8-140260 | 5/1996 |
| JP | 9-322435 | 12/1997 |
| JP | 10-155272 | 6/1998 |
| JP | 10-271668 | 10/1998 |
| JP | 11-196529 | 7/1999 |
| JP | 2001-86642 | 3/2001 |

OTHER PUBLICATIONS

Japanese Office Action mailed Jun. 2, 2015 in related Japanese Application No. 2012-020623.

* cited by examiner

*Primary Examiner* — Thienvu Tran
*Assistant Examiner* — Tien Mai
(74) *Attorney, Agent, or Firm* — Staas & Halsey LLP (57) ABSTRACT

A power distribution device includes power distribution ports that are connected to electric devices, respectively, and distribute a power supply signal to the electric devices, an inrush current suppressing circuit that collectively suppresses an inrush current on an upstream side ahead of the electric devices, a controller that detects an occurrence of the inrush current and outputs a switching instruction, and a switch that switches, based on the switching instruction, a path for the power supply signal to a first power supply path that causes the power supply signal to be input to the inrush current suppressing circuit when the inrush current has occurred, and that switches, on based on the switching instruction, the path for the power supply signal to a second power supply path that causes the power supply signal to bypass the inrush current suppressing circuit when the inrush current has not occurred.

3 Claims, 9 Drawing Sheets

POWER DISTRIBUTION DEVICE, POWER DISTRIBUTION SYSTEM AND METHOD FOR SUPPRESSING INRUSH CURRENT

CROSS-REFERENCE TO RELATED APPLICATION

This application is based upon and claims the benefit of priority of the prior Japanese Patent Application No. 2012-020623, filed on Feb. 2, 2012, the entire contents of which are incorporated herein by reference.

FIELD

The embodiments discussed herein are related to a power distribution device, a power distribution system and a method for suppressing an inrush current.

BACKGROUND

When alternating current (AC) power is supplied to an electric device such as a server or a storage device, an input current with an amount that is several times higher than an operating current may flow. The input current is called an inrush current (or a striking current).

The inrush current may occur due to charging a capacitor included in a power supply circuit arranged in the electric device. In this case, the occurrence of the inrush current is largely affected by the charging. In order to generate a direct-current voltage with a small pulsating component, an input smoothing capacitor with a large capacity is arranged in the power supply circuit on the input side of the power supply circuit. When the input smoothing capacitor is in an initial state, the amount of charges in the input smoothing capacitor is close to 0. Thus, when power is supplied, a large charging current instantaneously flows and becomes the inrush current.

When the inrush current occurs, a current that is larger than a rated current flows in a power supply line and may damage a circuit element or a connector. It is, therefore, important to suppress the inrush current in order to stably operate a system. Thus, the following technique has been proposed: a technique for inhibiting the occurrence of an inrush current when power is supplied or when a system is restored after an instantaneous power failure.

Japanese Laid-open Patent Publications Nos. 10-155272 and 11-196529 are examples of related art.

In recent years, with reductions in the sizes of electronic devices such as servers and storage devices and increases in the densities of the electronic devices, the number of various electronic devices capable of being placed in the same rack has increased. There is a problem that the larger the number of electronic devices placed in the same rack, the larger an inrush current that occurs in a whole system.

Since an inrush current occurs in each of power supply circuits included in the electronic devices, a method for controlling an electronic device and a level to which an inrush current is suppressed vary depending on a power supply circuit included in the electronic device. Thus, an inrush current suppressing circuit is arranged for each of the power supply circuits in many cases. There is, however, a problem that, for a configuration in which an inrush current suppressing circuit is arranged for each of power supply circuits included in electronic devices, as the number of electronic devices is increased, the cost for suppressing an inrush current increases.

SUMMARY

According to an aspect of the invention, a power distribution device includes a plurality of power distribution ports that are connected to electric devices, respectively, and distribute a power supply signal to the electric devices, an inrush current suppressing circuit that collectively suppresses an inrush current on an upstream side ahead of the electric devices, a controller that detects an occurrence of the inrush current and outputs a switching instruction, and a switch that switches, based on the switching instruction, a path for the power supply signal to a first power supply path that causes the power supply signal to be input to the inrush current suppressing circuit when the inrush current has occurred, and that switches, on based on the switching instruction, the path for the power supply signal to a second power supply path that causes the power supply signal to bypass the inrush current suppressing circuit when the inrush current has not occurred.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments are described with reference to the accompanying drawings.

First Embodiment

Figure 1A:
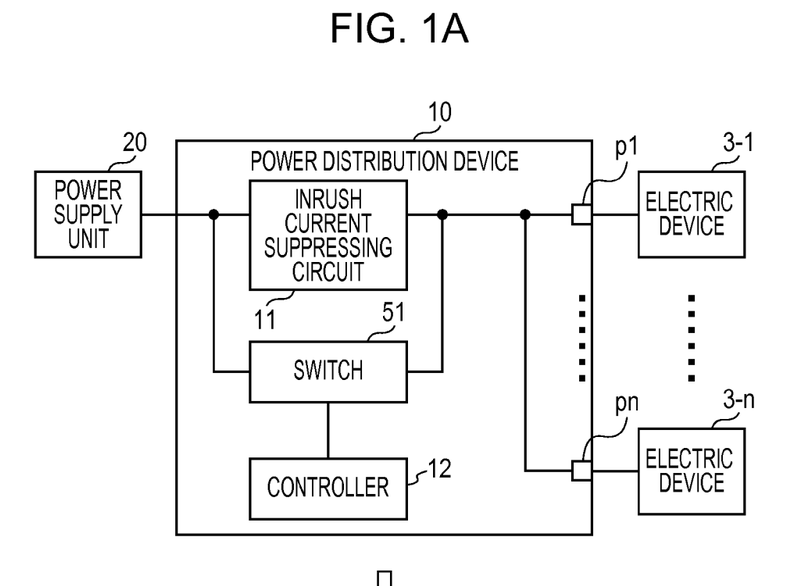
FIG. 1A is a diagram illustrating an example of the configuration of a power distribution device according to a first embodiment.

FIG. 1A is a diagram illustrating an example of the configuration of a power distribution device 10 according to the first embodiment. The power distribution device 10 is connected to a power supply unit 20 and electric devices 3-1 to 3-n and distributes a power supply signal supplied from the power supply unit 20 to the electric devices 3-1 to 3-n.

The power distribution device 10 includes an inrush current suppressing circuit 11, a controller 12, a switch 51 and power distribution ports p1 to pn. The power distribution ports p1 to pn are connected to the electric devices 3-1 to 3-n, respectively, and distribute the power supply signal to the electric devices 3-1 to 3-n.

The inrush current suppressing circuit 11 collectively suppresses an inrush current before the power supply signal is distributed to the electric devices 3-1 to 3-*n*. The controller 12 detects an occurrence of an inrush current and outputs a switching instruction to cause the switch 51 to switch the path for the power supply signal to a first or second power supply path.

Figure 1B:
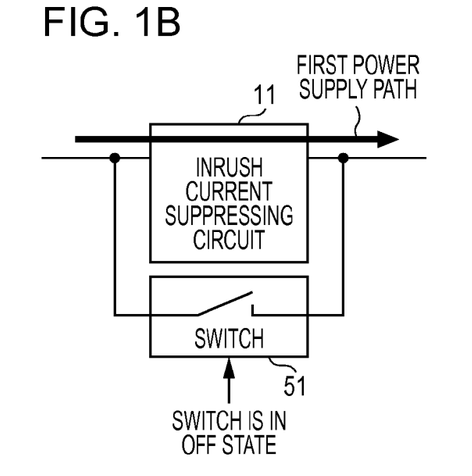
FIG. 1B is a diagram illustrating a first power supply path.
Figure 1C:
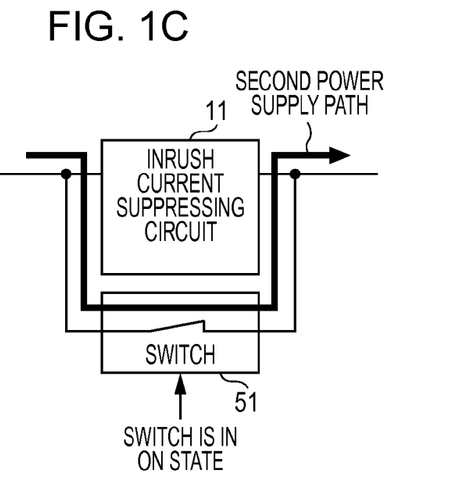
FIG. 1C is a diagram illustrating a second power supply path.

With reference to FIG. 1B, when an inrush current has occurred, the switch 51 switches so as to be in off state, on the basis of the switching instruction, the path for the power supply signal to the first power supply path that causes the power supply signal to be input to the inrush current suppressing circuit 11. With reference to FIG. 1C, when an inrush current has not occurred, the switch 51 switches so as to be in on state, on the basis of the switching instruction, the path for the power supply signal to the second power supply path that causes the power supply signal to bypass the inrush current suppressing circuit 11.

If an inrush current has occurred, the power distribution device 10 causes the power supply signal to be input to the inrush current suppressing circuit 11 and collectively suppresses the inrush current before the power supply signal is distributed to the electric devices 3-1 to 3-*n* connected to the power distribution ports p1 to pn. Thus, the electric devices do not have an inrush current suppressing circuit, and an inrush current can be suppressed at low cost.

Second Embodiment

As the second embodiment, a power distribution system that includes the power distribution device 10 is described below. An example of the power distribution device 10 is a power distribution tap that is called a power distribution unit (PDU).

Figure 2:
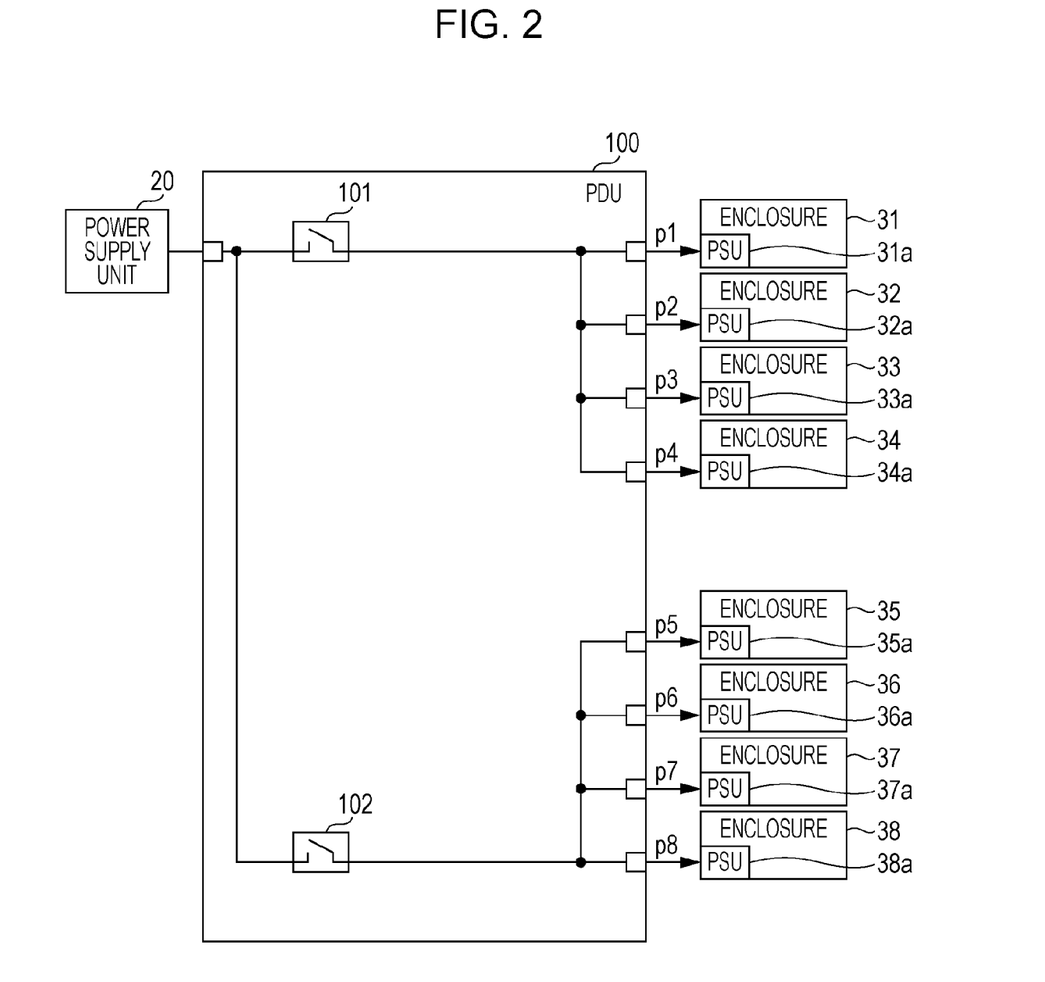
FIG. 2 is a diagram illustrating a reference example of a power distribution system that includes a PDU.

A reference example of a power distribution system that includes a PDU 100 is illustrated in FIG. 2. After problems with the reference example of the power distribution system are described with reference to FIG. 2, the second embodiment is described.

FIG. 2 is a diagram illustrating the reference example of the power distribution system that includes the PDU 100. The PDU 100 includes breakers 101 and 102. The PDU 100 is connected to the power supply unit 20 and enclosures 31 to 38.

The enclosures 31 to 34 include power supply units (PSUs) 31*a* to 34*a*, respectively. The enclosures 35 to 38 include PSUs 35*a* to 38*a*, respectively. The PSUs 31*a* to 38*a* convert AC power supply voltages received from the PDU 100 into direct current (DC) voltages and supply the DC voltages to devices included in the enclosures 31 to 38, respectively. The PSUs 31*a* to 38*a* include inrush current suppressing circuits (not illustrated), respectively.

One of ends of the breaker 101 and one of ends of the breaker 102 are connected to the power supply unit 20. The power supply unit 20 supplies an AC power supply voltage to the PDU 100. The power supply unit 20 corresponds to a power distribution board or an uninterruptible power supply (UPS).

The other end of the breaker 101 is connected through the power distribution boards p1 to p4 to the PSUs 31*a* to 34*a* included in the enclosures 31 to 34. The other end of the breaker 102 is connected through the power distribution boards p5 to p8 to the PSUs 35*a* to 38*a* included in the enclosures 35 to 38.

If an abnormal current flows in any of the PSUs 31*a* to 34*a* due to an overload or a short circuit, the breaker 101 opens a power supply path and blocks supply of power from the power supply unit 20 to the PSUs 31*a* to 34*a*. If an abnormal current flows in any of the PSUs 35*a* to 38*a* due to an overload or a short circuit, the breaker 102 opens a power supply path and blocks supply of power from the power supply unit 20 to the PSUs 35*a* to 38*a*.

The PDU 100 enables power to be efficiently supplied to many enclosures. For example, when the PSUs have power cables that connect the PSUs to AC outlets, respectively, and the number of enclosures placed in the same rack increases, the number of power cables per rack increases. For example, when servers that each have a height corresponding to 2 units (1 unit=1.75 inches) and include a redundant power supply are fully placed in a 19-inch rack that has a height corresponding to 40 units and is the mainstream of a data center, the number of power cables to be used is 40.

It is, however, difficult to directly connect 40 power cables to AC outlets of a general facility. The problem with the number of AC outlets is solved by connecting the PDU 100 to enclosures. In addition, the PDU 100 can be attached to a rack. Thus, the number of power cables extending from the rack can be reduced, and many power cables are not messed up on a floor.

Each of the PSUs 31*a* to 38*a* includes various capacitors including a smoothing capacitor. As described above, an inrush current occurs when at least one of the capacitors included in the PSUs is charged. The inrush current may occur when a circuit included in at least one of the PSUs starts operating or when at least one of the PSUs start outputting power.

Since an inrush current may occur in each of the PSUs, the PSUs have the respective inrush current suppressing circuits in the power distribution system illustrated in FIG. 2. In this case, however, there is a problem that when the number of enclosures placed in a rack is increased, the cost for suppressing an inrush current increases.

While it is assumed that AC cables are organized in the PDU 100 in a mission-critical system, the mission-critical system is configured so that PSUs included in enclosures suppress inrush currents to approximately 20 A in many cases. However, while it is not assumed that AC cables are organized in the PDU 100 in a small system, an inrush current of 500 A or more may occur in a PSU.

Thus, an inrush current of 100 A or more may occur on the input side of the PDU 100 connected to various enclosures. There are problems that a fuse and a breaker that are located on the side of a facility may erroneously operate and that the UPS may detect an excess current and stop outputting power. If there is a requirement for a downstream-side enclosure to have a PDU that can suppress an inrush current that has a certain amount or more and has occurred on the input side of the PDU, the number of enclosures capable of being connected to the PDU is limited, and whereby the versatility of the system is reduced.

The power distribution system according to the second embodiment is configured to avoid the aforementioned problems. Since the power distribution system suppresses an inrush current input to the PDU, the inrush current can be suppressed at low cost. In addition, the power distribution system inhibits the power distribution board or the UPS from erroneously operating. Furthermore, the power distribution system can be connected to various enclosures whose power supply specifications vary.

Next, an example of the configuration of the power distribution system that includes the power distribution device 10 is described. Hereinafter, the power distribution device 10 is referred to as a PDU.

Figure 3:
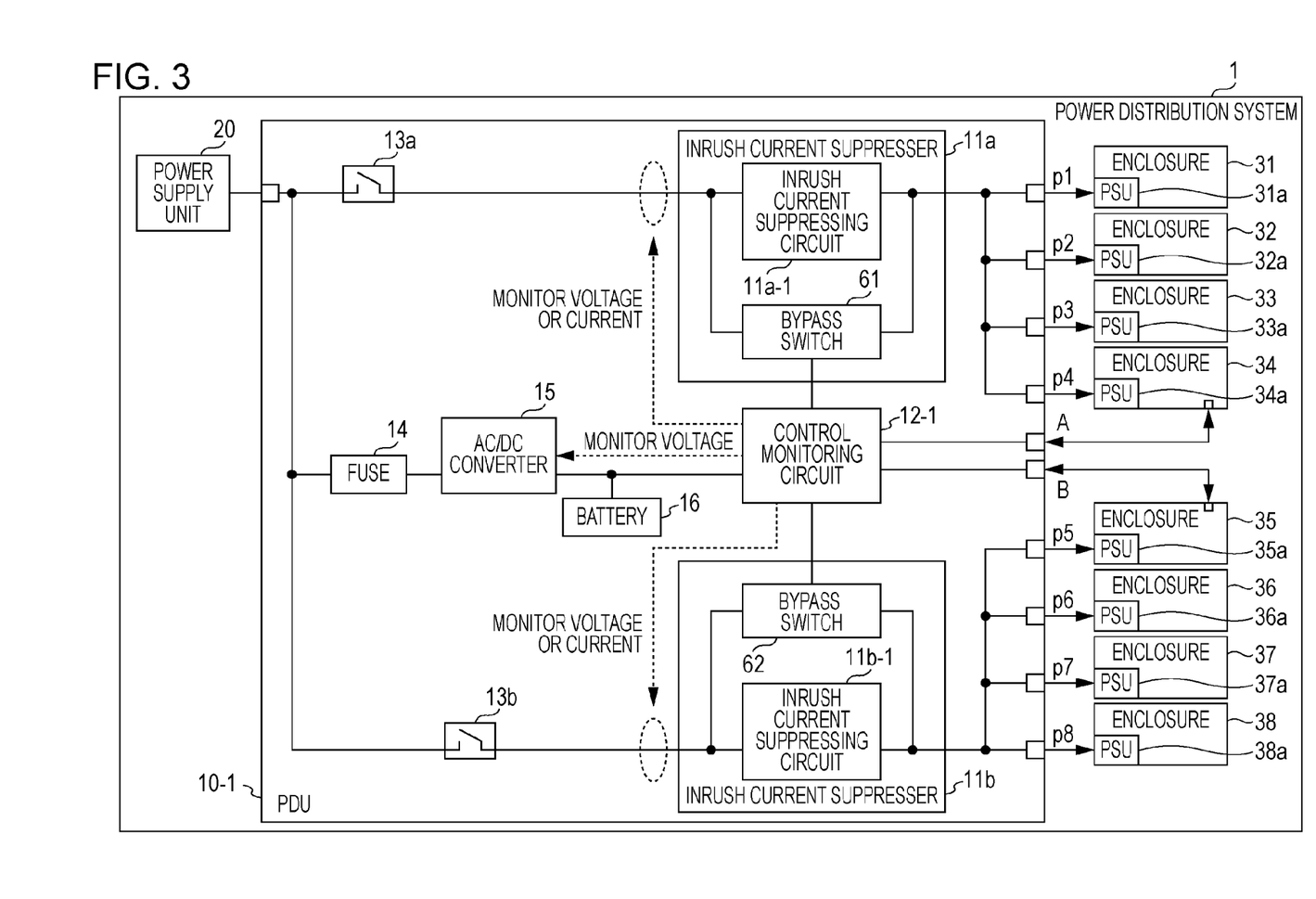
FIG. 3 is a diagram illustrating an example of the configuration of a power distribution system according to a second embodiment.

FIG. 3 is a diagram illustrating the example of the configuration of the power distribution system according to the second embodiment. A power distribution system 1 includes a PDU 10-1, the power supply unit 20 and the enclosures 31 to 38. The power supply unit 20 and the enclosures 31 to 38 are described above with reference to FIG. 2.

The PDU 10-1 includes inrush current suppressers 11a and 11b, a control monitoring circuit 12-1, breakers 13a and 13b, a fuse 14, an AC/DC converter 15, a battery 16, power distribution ports p1 to p8 and external interface ports A and B.

The inrush current suppresser 11a includes an inrush current suppressing circuit 11a-1 and a bypass switch 61. The inrush current suppresser 11b includes an inrush current suppressing circuit 11b-1 and a bypass switch 62.

The PDU 10-1 is connected to the power supply unit 20 and the enclosures 31 to 38.

The enclosures 31 to 34 include the PSUs 31a to 34a, respectively. The enclosures 35 to 38 include the PSUs 35a to 38a, respectively.

One of ends of the breaker 13a and one of ends of the breaker 13b are connected to the power supply unit 20. The power supply unit 20 corresponds to the power distribution board or the UPS.

The other end of the breaker 13a is connected to an input end of the inrush current suppresser 11a. The input end of the inrush current suppresser 11a is branched into two branched lines in the inrush current suppresser 11a. While one of the branched lines is connected to an input end of the inrush current suppressing circuit 11a-1, the other branched line is connected to an input end of the bypass switch 61.

An output end of the inrush current suppressing circuit 11a-1 and an output end of the bypass switch 61 join together in the inrush current suppresser 11a and are connected to an output end of the inrush current suppresser 11a. The output end of the inrush current suppresser 11a is connected to the power distribution ports p1 to p4. The power distribution ports p1 to p4 are connected to the PSUs 31a to 34a included in the enclosures 31 to 34, respectively.

The other end of the breaker 13b is connected to an input end of the inrush current suppresser 11b. The input end of the inrush current suppresser 11b is branched into two branched lines in the inrush current suppresser 11b. While one of the branched lines is connected to an input end of the inrush current suppressing circuit 11b-1, the other branched line is connected to an input end of the bypass switch 62.

An output end of the inrush current suppressing circuit 11b-1 and an output end of the bypass switch 62 join together in the inrush current suppresser 11b and are connected to an output end of the inrush current suppresser 11b. The output end of the inrush current suppresser 11b is connected to the power distribution ports p5 to p8. The power distribution ports p5 to p8 are connected to the PSUs 355a to 38a included in the enclosures 35 to 38, respectively.

One of terminals of the fuse 14 is connected to the power supply unit 20, while the other terminal of the fuse 14 is connected to an input end of the AC/DC converter 15. An output end of the AC/DC converter 15 is connected to the control monitoring circuit 12-1. The AC/DC converter 15 supplies DC power to the control monitoring circuit 12-1. The battery 16 is connected to the AC/DC converter 15 and the control monitoring circuit 12-1 and can supply power to the control monitoring circuit 12-1.

If an abnormal current flows in any of the PSUs 31a to 34a due to an overload or a short circuit, the breaker 13a opens a path for the power supply signal and blocks the supply of the power supply signal from the power supply unit 20 to the PSUs 31a to 34a. If an abnormal current flows in any of the PSUs 35a to 38a due to an overload or a short circuit, the breaker 13b opens a path for the power supply signal and blocks the supply of the power supply signal from the power supply unit 20 to the PSUs 35a to 38a.

The control monitoring circuit 12-1 monitors voltages or currents on the output sides of the breakers 13a and 13b and monitors a voltage of the AC/DC converter 15. The control monitoring circuit 12-1 can detect the time of the occurrence of an inrush current and control the bypass switches 61 and 62.

The control monitoring circuit 12-1 is connected to the enclosures 31 to 34 through the external interface port A. FIG. 3, however, is simplified and illustrates that the external interface port A is connected only to the enclosure 34. The control monitoring circuit 12-1 is connected to the enclosures 35 to 38 through the external interface port B. FIG. 3, however, is simplified and illustrates that the external interface port B is connected only to the enclosure 35.

The control monitoring circuit 12-1 receives control instructions from the enclosures 31 to 38 through the external interface ports A and B. The control monitoring circuit 12-1 controls the bypass switches 61 and 62 on the basis of the received control instructions.

Each of the bypass switches 61 and 62 is set to an OFF state only at the time of the occurrence of an inrush current on the basis of a switching instruction transmitted by the control monitoring circuit 12-1. When the bypass switch 61 is set to the OFF state, the path for the power supply signal is switched to a path that causes the power supply signal to be input to the inrush current suppressing circuit 11a-1. Thus, the inrush current flows in the inrush current suppressing circuit 11a-1 and is suppressed by the inrush current suppressing circuit 11a-1. When the bypass switch 62 is set to the OFF state, the path for the power supply signal is switched to a path that causes the power supply signal to be input to the inrush current suppressing circuit 11b-1. Thus, the inrush current flows in the inrush current suppressing circuit 11b-1 and is suppressed by the inrush current suppressing circuit 11b-1.

Figure 4:
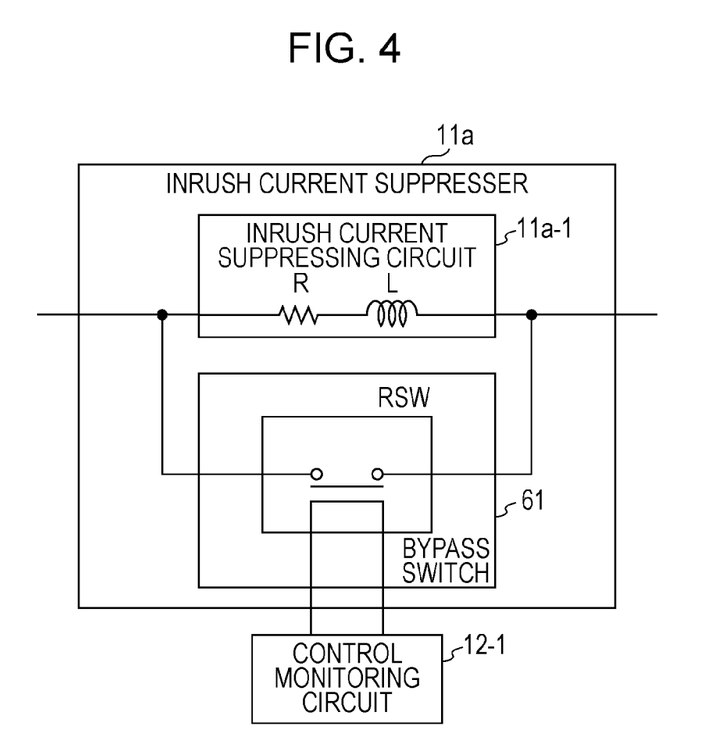
FIG. 4 is a diagram illustrating an example of an inner configuration of an inrush current suppressor.

FIG. 4 is a diagram illustrating an example of an inner configuration of the inrush current suppresser 11a. The inrush current suppressing circuit 11a-1 includes a resistor R and a coil L, for example. The bypass switch 61 is made up of a relay switch RSW, for example. The inrush current suppresser 11b can be achieved by the same configuration as the inrush current suppresser 11a.

One of ends of the resistor R is connected to one of ends of the relay switch RSW and the end of the breaker 13a illustrated in FIG. 3. The other end of the resistor R is connected to one of ends of the coil L. The other end of the coil L is connected to the other end of the relay switch RSW and connected to the PSUs 31a to 34a through the power distribution ports p1 to p4 illustrated in FIG. 3.

In the example illustrated in FIG. 4, the inrush current suppressing circuit 11a-1 is made up of the resistor R and the coil L. The inrush current suppressing circuit 11a-1, however, may be made up of only the resistor R. The bypass switch 61 is made up of the relay switch RSW, but may be made up of a thyristor.

Next, a time when an inrush current occurs is described. The following three cases can be considered as the time when the inrush current occurs.

(1) When the Power Distribution System 1 is Normally Activated

For example, a time when the power distribution system 1 is normally activated corresponds to a time when an AC input outlet is connected, or a time when a power distribution board breaker is changed from an OFF state to an ON state, or a time when an output state of the UPS is changed from an OFF state to an ON state, or the like.

(2) When the Input AC Power Supply Voltage is Abnormal

A time when the input AC power supply voltage is abnormal corresponds to a time when the voltage of the input AC power is instantaneously reduced, or a time when the AC power is resupplied after stop of the supply of the AC power (when the power distribution system 1 is restored after an instantaneous power failure), or the like.

(3) When a Load of at Least One of the Enclosure Changes

A time when a load of at least one of the enclosures changes corresponds to a time when a device that is included in the enclosure is changed from a standby state to an operating state. For example, when disk devices that are included in the enclosures corresponds to a massive array of idle disks (MAID), the time when the load of the enclosure changes corresponds to a time when the disk device is changed from a spin-down state to a spin-up state, or the like.

Figure 5:
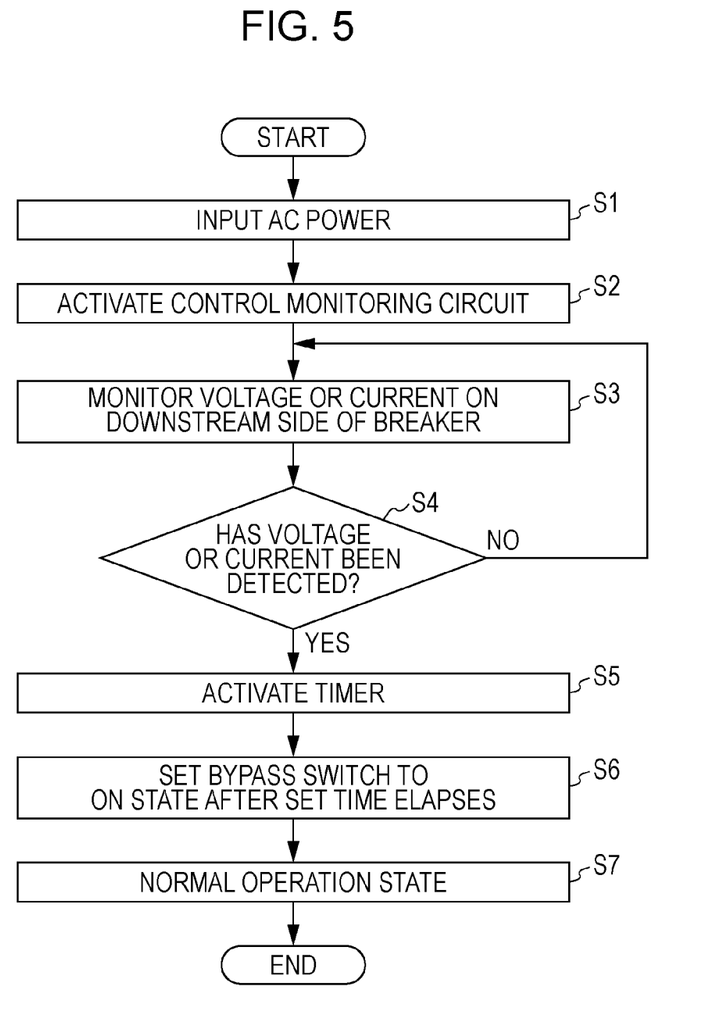
FIG. 5 is a flowchart of operations of the PDU.

Next, operations of the PDU 10-1 when an inrush current occurs are described using flowcharts. FIG. 5 is a flowchart of operations of the PDU 10-1. FIG. 5 illustrates the operations of the PDU 10-1 when the power distribution system 1 is normally activated (as described in the aforementioned Item (1)).

In step S1, the AC power is input to the power distribution system 1. For example, the time when the AC power is input to the power distribution system 1 corresponds to the time when the outlet of the power supply unit 20 is connected to the AC power supply.

In step S2, the power is supplied to the control monitoring circuit 12-1, and the control monitoring circuit 12-1 is activated. The control monitoring circuit 12-1 sets the bypass switches 61 and 62 to the open (OFF) state. When the bypass switches 61 and 62 are in the OFF state, the power supply path is the first power supply path illustrated in FIG. 1. The power supply signal flows from the power supply unit 20 to the inrush current suppressing circuits 11a-1 and 11b-1. It is preferable that the bypass switches 61 and 62 be in the OFF state even when the control monitoring circuit 12-1 is not activated. For example, it is preferable that normally-off switches be used as the bypass switches 61 and 62.

The control monitoring circuit 12-1 executes processes of the following steps S3 to S7 on each of two systems that are a system including the breaker 13a and the inrush current suppresser 11a and a system including the breaker 13b and the inrush current suppresser 11b. The processes that are executed on the system including the breaker 13a and the inrush current suppresser 11a are described below.

In step S3, the control monitoring circuit 12-1 monitors a voltage or a current on the downstream side of the breaker 13a.

When the control monitoring circuit 12-1 detects that the voltage or the current exceeds a predetermined value (Yes in step S4), the process illustrated in FIG. 5 proceeds to step S5. When the voltage detected by control monitoring circuit 12-1 or the current detected by control monitoring circuit 12-1 is equal to or lower than the predetermined value (No in step S4), the process proceeds to step S3. For example, when the breaker 13a starts operating and a power supply of at least one of the enclosures 31 to 34 connected to the power distribution ports p1 to p4 is set to an ON state, the control monitoring circuit 12-1 detects that the voltage or the current exceeds the predetermined value.

In step S5, the control monitoring circuit 12-1 activates a timer included in the control monitoring circuit 12-1.

In step S6, after a time set in the timer elapses, the control monitoring circuit 12-1 sets the bypass switch 61 to the closed (ON) state. The time is set in the timer so that the set time sufficiently includes a time period for charging a capacitor included in a general PSU included in an enclosure and a time period for stabilizing a voltage output from the PSU. When the bypass switch 61 is in the ON state, the power supply path is the second power supply path illustrated in FIG. 1, and the power supply signal flows from the power supply unit 20 through the bypass switch 61 to the downstream-side enclosures.

In step S7, the bypass switch 61 is in the ON state, and the path through which the power is supplied bypasses the inrush current suppressing circuit 11a-1 and passes through the bypass switch 61. In this state, the enclosures 31 to 34 are operated in a normal operation state.

As described above, the control monitoring circuit 12-1 monitors the voltage or current of the input AC power. Before the voltage or the current reaches a rated voltage or a rated current, the bypass switches 61 and 62 become the OFF state, and an inrush current flows into the inrush current suppressing circuits 11a-1 and 11b-1. When the voltage or the current reaches the rated voltage or the rated current, the bypass switches 61 and 62 become the ON state, and the power is distributed to the enclosures 31 to 38 through the bypass switches 61 and 62.

The inrush current is collectively controlled and suppressed on the upstream side ahead of the enclosures 31 to 38. Thus, an inrush current suppressing circuit is not arranged in each of the enclosures 31 to 38, and the cost for suppressing the inrush current can be reduced. In addition, there is no requirement for the PSUs 31a to 38a of the enclosures 31 to 38 to have a circuit for suppressing an inrush current with a predetermined amount or more. Thus, enclosures whose power supply specifications vary can be connected to the PDU 10-1.

The inrush current input to the PDU 10-1 is suppressed in the PDU 10-1 and whereby the PDU 10-1 can inhibit the power supply unit 20 (the power distribution board or the UPS, for example) from erroneously operating. For example, if a large inrush current occurs due to activations of the enclosures 31 to 38 after the power is supplied from the power supply unit 20 to the PDU 10-1, a breaker included in the power supply unit 20 or the UPS may stop the supply of the power and whereby the enclosures 31 to 38 may not be activated. In addition, if an inrush current occurs for the same reason, the breakers 13a and 13b included in the PDU 10-1 may block the supply of the power. Such situations can be avoided by the PDU 10-1 that suppresses an inrush current in the PDU 10-1.

Figure 6:
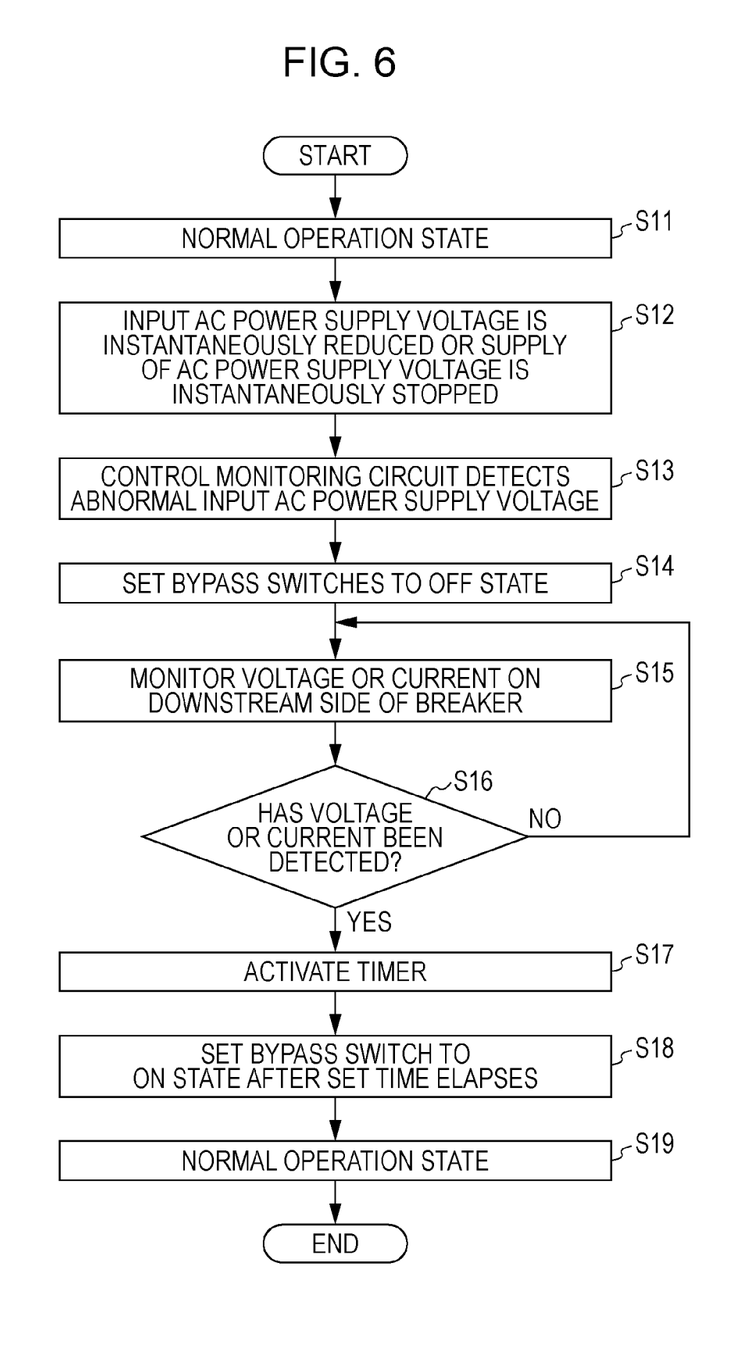
FIG. 6 is a flowchart of operations of the PDU.

FIG. 6 is a flowchart of operations of the PDU 10-1. FIG. 6 illustrates the operations of the PDU 10-1 when the input AC power supply voltage is abnormal (as described in the aforementioned item 2).

In step S11, while the bypass switches 61 and 62 are in the ON state and the path through which the power is supplied bypasses the inrush current suppressing circuits 11a-1 and 11b-1 and passes through the bypass switches 61 and 62, the power distribution system 1 is operated (in a normal operation state).

In step S12, the voltage of the input AC power is instantaneously reduced or the supply of the voltage of the input AC power is instantaneously stopped.

In step S13, the control monitoring circuit 12-1 detects, on the basis of the result of monitoring the voltage output from the AC/DC converter 15, the instantaneous reduction in the voltage of the input AC power or the instantaneous stop of the supply of the voltage of the input AC power (the determination of the detection is described later with reference to FIG. 7).

In step S14, the control monitoring circuit 12-1 sets the bypass switches 61 and 62 to the OFF state. When the bypass switches 61 and 62 are in the OFF state, the power supply path is the first power supply path illustrated in FIG. 1, and the power supply signal flows from the power supply unit 20 to the inrush current suppressing circuits 11a-1 and 11b-1.

A voltage is supplied from the battery 16 to the control monitoring circuit 12-1. When detecting the instantaneous reduction in the voltage of the input AC power in step S13, the control monitoring circuit 12-1 can operate with the voltage supplied from the battery 16.

The control monitoring circuit 12-1 executes processes of the following steps S15 to S19 on each of the systems that are the system including the breaker 13a and the inrush current suppresser 11a and the system including breaker 13b and the inrush current suppresser 11b. The processes that are executed on the system including the breaker 13a and the inrush current suppresser 11a are described below.

In step S15, the control monitoring circuit 12-1 monitors the voltage or the current on the downstream side of the breaker 13a.

When the control monitoring circuit 12-1 detects the voltage or the current (Yes in step S16), the process illustrated in FIG. 6 proceeds to step S17. When the control monitoring circuit 12-1 does not detect the voltage or the current (No in step S16), the process returns to step S15.

In step S17, the control monitoring circuit 12-1 activates the timer included in the control monitoring circuit 12-1.

In step S18, after a time that is set in the timer in advance elapses, the control monitoring circuit 12-1 sets the bypass switch 61 to the ON state. When the bypass switch 61 is in the ON state, the power supply path is the second power supply path illustrated in FIG. 1, and the power supply signal flows from the power supply unit 20 through the bypass switch 61 to the downstream-side enclosures.

In step S19, the bypass switch 61 is in the ON state, and the path through which the power is supplied bypasses the inrush current suppressing circuit 11a-1 and passes through the bypass switch 61. In this state, the enclosures 31 to 34 are operated in the normal operation state.

In step S13, the control monitoring circuit 12-1 may detect a voltage applied between the breaker 13a and the inrush current suppresser 11a and a voltage applied between the breaker 13b and the inrush current suppresser 11b. In this case, the control monitoring circuit 12-1 executes the processes of steps S13 to S19 on each of the systems that are the system including the breaker 13a and the inrush current suppresser 11a and the system including breaker 13b and the inrush current suppresser 11b.

Figure 7:
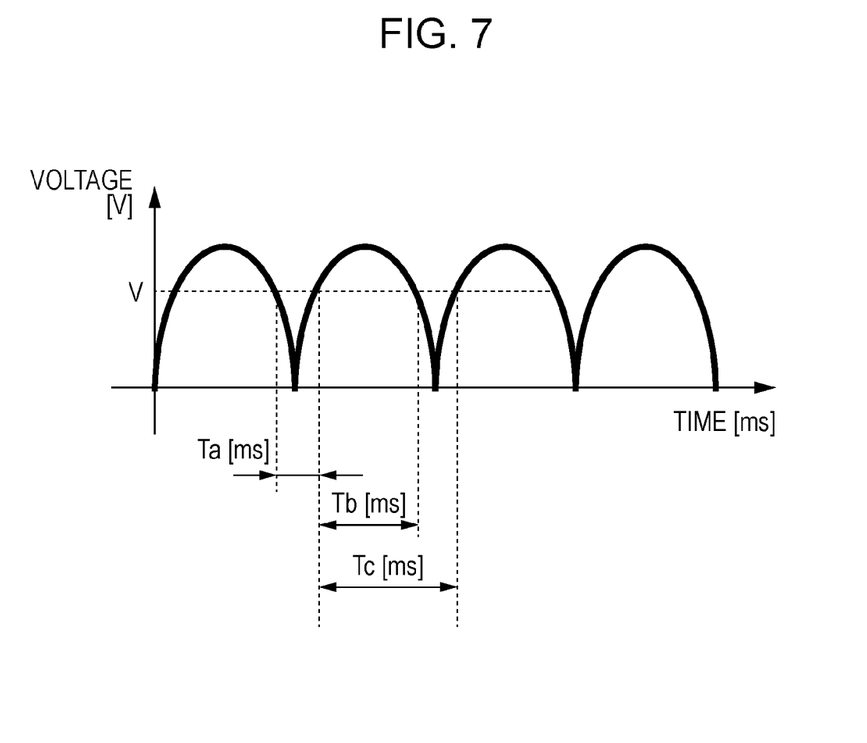
FIG. 7 is a diagram describing the determination of the detection of an abnormality of an input AC power supply voltage.

FIG. 7 is a diagram describing the determination of the detection of an abnormality of the input AC power supply voltage. In FIG. 7, the ordinate indicates the voltage (V), and the abscissa indicates time (milliseconds).

The control monitoring circuit 12-1 monitors the input AC power supply voltage and thereby determines whether or not the AC power supply voltage is normal. Requirements for the control monitoring circuit 12-1 to detect an abnormality of the input AC power supply voltage are the following three requirements (a) to (c), for example. If at least one of the requirements (a) to (c) is satisfied, the control monitoring circuit 12-1 detects that the input AC power supply voltage is abnormal. If two or more of the requirements (a) to (c) are satisfied, the control monitoring circuit 12-1 may detect that the input AC power supply voltage is abnormal.

(a) If the input AC power supply voltage is continuously equal to or lower than a preset threshold voltage V for a given time period Ta, the control monitoring circuit 12-1 detects that the input AC power supply voltage is abnormal.

(b) If the input AC power supply voltage continuously exceeds a preset threshold voltage V for a given time period Tb, the control monitoring circuit 12-1 detects that the input AC power supply voltage is abnormal.

(c) If the input AC power supply voltage does not exceed a preset threshold voltage V within a given time period Tc, the control monitoring circuit 12-1 detects that the input AC power supply voltage is abnormal. If the threshold voltages V used for the requirements (b) and (c) are common, Tc>Tb.

The threshold voltages used for the requirements (a) to (c) may be different from each other.

As described above, when detecting an instantaneous reduction in the voltage or a power failure, the control monitoring circuit 12-1 sets the bypass switches 61 and 62 to the OFF state and distributes the power to the enclosures 31 to 38 through the inrush current suppressing circuits 11a-1 and 11b-1.

Since an inrush current is collectively controlled and suppressed on the upstream side ahead of the enclosures 31 to 38, the enclosures 31 to 38 do not have an inrush current suppressing circuit, and the cost for suppressing an inrush current can be reduced. In addition, there is no requirement for the PSUs 31a to 38a of the enclosures 31 to 38 to have a circuit for suppressing an inrush current with a predetermined amount or more. Thus, enclosures whose power supply specifications vary can be connected to the PDU 10-1.

The inrush current input to the PDU 10-1 is suppressed in the PDU 10-1 and whereby the PDU 10-1 can inhibit the power supply unit 20 (the power distribution board or the UPS, for example) and the breakers 13a and 13b included in the PDU 10-1 from erroneously operating.

Figure 8:
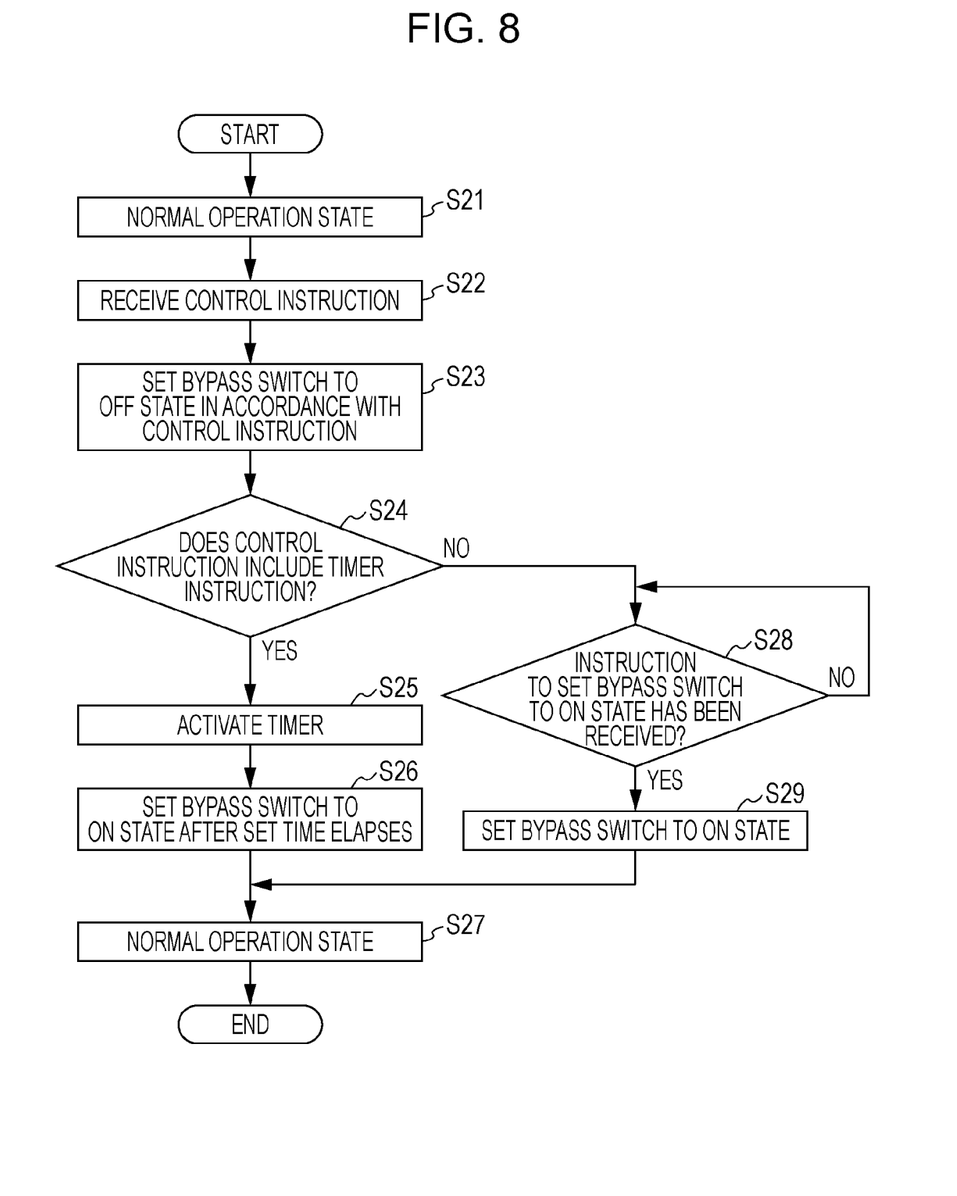
FIG. 8 is a flowchart of operations of the PDU.

FIG. 8 is a flowchart of operations of the PDU 10-1. FIG. 8 illustrates the operations of the PDU 10-1 when a load of at least one of the enclosures varies as described in the aforementioned Item (3).

In step S21, while the bypass switches 61 and 62 are in the ON state and the path through which the power is supplied bypasses the inrush current suppressing circuits 11a-1 and 11b-1 and passes through the bypass switches 61 and 62, the power distribution system 1 is operated (in the normal operation state).

In step S22, the control monitoring circuit 12-1 receives information of a control instruction from any of the enclosures 31 to 38 through any of the external interface ports A and B.

In step S23, the control monitoring circuit 12-1 sets, to the OFF state in accordance with the information of the control instruction, a bypass switch that is among the bypass switches 61 and 62 and exists on the power supply path extending to the enclosure from which the control monitoring circuit 12-1 has received the information of the control instruction. The case where the bypass switch 61 is set to the OFF state is described below as an example. When the bypass switch 61 is in the OFF state, the power supply path is the first power supply path illustrated in FIG. 1, and the power supply signal flows from the power supply unit 20 to the inrush current suppressing circuit 11a-1.

In step S24, the control monitoring circuit 12-1 determines whether or not the control instruction includes a timer instruction. If the control instruction includes the timer instruction (Yes in step S24), the process illustrated in FIG. 8 proceeds to step S25. If the control instruction does not include the timer instruction (No in step S24), the process proceeds to step S28.

In step S25, the control monitoring circuit 12-1 activates the timer included in the control monitoring circuit 12-1.

In step S26, after a time that is set in the timer in advance elapses, the control monitoring circuit 12-1 sets the bypass switch 61 to the ON state. The time set in the timer may be a time specified in the information that has been received in step S22 and indicates the control instruction. If the bypass switch 61 is in the ON state, the power supply path is the second power supply path, and the power supply signal flows from the power supply unit 20 through the bypass switch 61 to the downstream-side enclosures.

In step S27, the bypass switch 61 is in the ON state, and the path through which the power is supplied bypasses the inrush current suppressing circuit 11a-1 and passes through the bypass switch 61. In this state, the enclosures 31 to 34 are operated in the normal operation state.

In step S28, the control monitoring circuit 12-1 determines whether or not the control monitoring circuit 12-1 has received, from the interested enclosure, an instruction to set the bypass switch 61 to the ON state. If the control monitoring circuit 12-1 has received the instruction (Yes in step S28), the process proceeds to step S29. If the control monitoring circuit 12-1 has not received the instruction (No in step S28), the control monitoring circuit 12-1 waits to receive the instruction to set the bypass switch 61 to the ON state.

In step S29, the control monitoring circuit 12-1 sets the bypass switch 61 to the ON state. The process proceeds to step S27.

As described above, the control monitoring circuit 12-1 changes each of the bypass switch 61 or 62 to the ON or OFF state in accordance with a control instruction received when a load of at least one of the enclosures 31 to 38 varies.

In this manner, an inrush current is collectively controlled and suppressed on the upstream side ahead of the enclosures 31 to 38. Thus, the enclosures 31 to 38 do not have an inrush current suppressing circuit, and the cost for suppressing an inrush current can be reduced. In addition, there is no requirement for the PSUs 31a to 38a of the enclosures to have a circuit for suppressing an inrush current with a predetermined amount or more. Thus, enclosures whose power supply specifications vary can be connected to the PDU 10-1.

The inrush current input to the PDU 10-1 is suppressed in the PDU 10-1 and whereby the PDU 10-1 can inhibit the power supply unit 20 (the power distribution board or the UPS, for example) and the breakers 13a and 13b included in the PDU 10-1 from erroneously operating. The control illustrated in FIG. 8 is effective for a large inrush current that occurs when an enclosure is turned on from a standby state.

Figure 9:
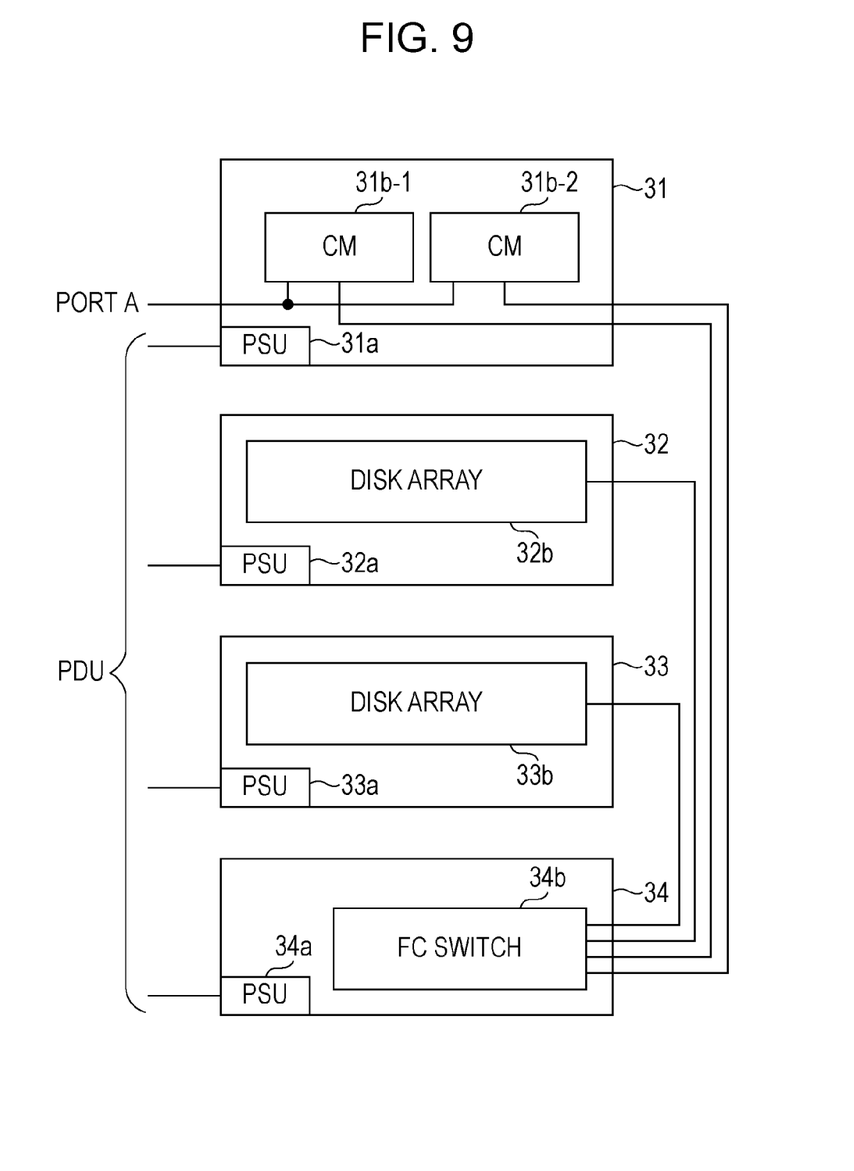
FIG. 9 is a diagram illustrating an example of the configurations of enclosures.

Next, exemplary configurations of the enclosures are described. FIG. 9 is a diagram illustrating an example of the configurations of the enclosures 31 to 34.

The enclosures 31 to 34 have devices that form a storage system. The enclosures 31 to 34 include the PSUs 31a to 34a, respectively. The PSUs 31a to 34a convert the AC power supplied from the PDU 10-1 into direct currents and supply the direct currents to the devices included in the enclosures 31 to 34.

The enclosure 31 includes controller modules (CMs) 31b-1 and 31b-2. The CMs 31b-1 and 31b-2 are control servers that comprehensively control the storage system. The CMs 31b-1 and 31b-2 are computers that each include a central processing unit (CPU) and a memory, for example. In the present embodiment, the two CMs 31b-1 and 31b-2 are redundant in order to improve access reliability.

The enclosures 32 and 33 include disk arrays 32b and 33b, respectively. Each of the disk arrays 32b and 33b includes a plurality of storage devices to be accessed and controlled by the CMs 31b-1 and 31b-2. The storage devices are hard disk drives (HDDs), solid state drives (SDDs) or the like, for example.

The enclosure 34 includes a fiber channel (FC) switch 34b. The FC switch 34b relays data transmitted and to be received between the CMs 31b-1, 31b-2 and the disk arrays 32b, 33b through FC cables.

The CMs 31b-1 and 31b-2 are connected to a host device (not illustrated) and read and write data from and in the storage devices included in the disk arrays 32b and 33b in accordance with an in/out (I/O) request transmitted by the host device. The CMs 31b-1 and 31b-2 use Redundant Arrays of Inexpensive Disks (RAID) to manage physical storage regions achieved by the storage devices included in the disk arrays 32b and 33b. The CMs 31b-1 and 31b-2 control access to the physical storage regions.

The CMs 31b-1 and 31b-2 and the HDDs of the disk arrays 32b and 33b correspond to the MAID. The CM 31b-1 or 31b-2 instructs an HDD that is among the HDDs of the disk arrays 32b and 33b and whose frequency of use is low to spin down, and the CM 31b-1 or 31b-2 stops a rotation of a magnetic disk of the HDD. Before the CM 31b-1 or 31b-2 instructs the spun-down HDD to spin up, the CM 31b-1 or 31b-2 outputs, to the external interface port A of the PDU, information of a control instruction to instruct the PDU to suppress an inrush current. The information of the control instruction corresponds to the information that is received by the control monitoring circuit 12 in step S22 illustrated in FIG. 8.

The CMs 31b-1 and 31b-2 can instruct the HDDs to spin down on a RAID group basis. RAID groups are logical storage regions formed by combining the physical storage regions of the plurality of storage devices arranged in the disk arrays 32b and 33b. When the CM 31b-1 or 31b-2 instructs HDDs included in a RAID group to spin up, the magnetic disks of the HDDs concurrently start rotating, and whereby a load largely varies. The output of the information of the control instruction suppresses the occurrence of an inrush current that is caused by the variation in the load.

Although the embodiments are described above, the configurations of the parts described in the embodiments may be replaced with other configurations. In addition, other arbitrary constituent elements and processes may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power distribution device comprising:
a plurality of power distribution ports that are connected to electric devices, respectively, and distribute a power supply signal to the electric devices;
an inrush current suppressing circuit that collectively suppresses an inrush current on an upstream side ahead of the electric devices;
a controller that detects an occurrence of the inrush current and outputs a switching instruction; and
a switch that switches, based on the switching instruction, a path for the power supply signal to a first power supply path that causes the power supply signal to be input to the inrush current suppressing circuit when the inrush current has occurred, and that switches, based on the switching instruction, the path for the power supply signal to a second power supply path that causes the power supply signal to bypass the inrush current suppressing circuit when the inrush current has not occurred, wherein when the controller receives a first instruction from one of the electric devices connected to the power distribution ports, the controller outputs a switching instruction to cause the switch to switch the path for the power supply signal to the first power supply path, and wherein when the controller receives a second instruction from the one of the electric devices connected to the power distribution ports after receiving the first instruction, the controller outputs a switching instruction to cause the switch to switch the path for the power supply signal to the second power supply path.

2. A power distribution system comprising:

a plurality of electric devices;

a plurality of power distribution ports that are connected to the plurality of electric devices, respectively, and distribute a power supply signal to the electric devices;

an inrush current suppressing circuit that collectively suppresses an inrush current on the upstream side ahead of the electric devices;

a controller that detects an occurrence of the inrush current and outputs a switching instruction; and a switch that switches, on the basis of the switching instruction, a path for the power supply signal to a first power supply path that causes the power supply signal to be input to the inrush current suppressing circuit when the inrush current has occurred, and that switches, on the basis of the switching instruction, the path for the power supply signal to a second power supply path that causes the power supply signal to bypass the inrush current suppressing circuit when the inrush current has not occurred, wherein when the controller receives a first instruction from one of the electric devices connected to the power distribution ports, the controller outputs a switching instruction to cause the switch to switch the path for the power supply signal to the first power supply path, and wherein when the controller receives a second instruction from the one of the electric devices connected to the power distribution ports after receiving the first instruction, the controller outputs a switching instruction to cause the switch to switch the path for the power supply signal to the second power supply path.

3. A method for suppressing an inrush current in a power distribution device, comprising:

distributing a power supply signal to a plurality of electric devices through a plurality of power distribution ports that are connected to the plurality of electric devices; and switching a path for the power supply signal from a second power supply path bypassing the inrush current suppressing circuit and connected to the plurality of power distribution ports to a first power supply path extending through the inrush current suppressing circuit and connected to the plurality of power distribution ports when an occurrence of the inrush current is detected, wherein when a first instruction is received from one of the electric devices connected to the power distribution ports, the path for the power supply signal is switched to the first power supply path, and wherein when a second instruction is received from the one of the electric devices connected to the power distribution ports after the reception of the first instruction, the path for the power supply signal is switched to the second power supply path.

* * * * *